United States Patent [19]

Lewis

[11] Patent Number: 5,502,653
[45] Date of Patent: Mar. 26, 1996

[54] TESTING DATA TRANSMISSIONS BETWEEN FAX MODEMS THROUGH REAL TIME SYNCHRONIZATION AND RESYNCHRONIZATION OF ASYNCHRONOUS DATA

[75] Inventor: Glenn M. Lewis, Fair Oaks, Calif.

[73] Assignee: Intel Corporation, Santa Clara, Calif.

[21] Appl. No.: 121,611

[22] Filed: Sep. 15, 1993

[51] Int. Cl.[6] ............................. H03K 7/08; H03K 9/08
[52] U.S. Cl. ......................... 364/514 B; 371/34; 371/42; 371/47.1; 375/238
[58] Field of Search ................................. 358/406, 409, 358/8, 10; 370/10, 15; 371/2.1, 34, 35, 37.8, 42, 47.1, 67.1; 375/222; 364/514 A, 514 B, 514 C, 514 R, 514

[56] References Cited

U.S. PATENT DOCUMENTS

| 3,622,877 | 11/1971 | MacDavid | 375/8 |
| 4,247,934 | 1/1981 | Parras | 375/10 |
| 4,618,965 | 10/1986 | Maxwell et al. | 375/10 |
| 4,747,105 | 5/1988 | Wilson et al. | 371/47.1 |
| 4,754,457 | 6/1988 | Bright et al. | 375/116 X |

Primary Examiner—Ellis B. Ramirez
Assistant Examiner—Edward Pipala
Attorney, Agent, or Firm—Blakely, Sokoloff, Taylor & Zafman

[57] ABSTRACT

The present invention provides method and apparatus for testing data transmissions between fax modems (and other data transmission devices which utilize asynchronous serial ports for connection of DTE equipment) through synchronization and resynchronization of data bits input to a computer from a receiving fax modem with a plurality of preshifted sequences of data bits stored in the computer's memory. In a closed loop testing environment, first and second fax modems are connected together via a synchronous telephone line and are coupled to a computer via first and second asynchronous lines input to the computer's COM ports. The program utilized by the computer initially stores in memory a first sequence of data bits partitioned into units with each unit comprising N data bits. It then stores in memory N-1 preshifted sequences of data bits with each consecutive preshifted sequence comprising data bits corresponding to the data bits of the first sequence successively shifted by one data bit from each preceding preshifted sequence. The data bits of the first sequence are then transmitted to the first modem for retransmission via the FAX CCITT T.4/T.30 standards to the second modem. The computer then receives as output from the second modem an input sequence of data bits which is then synchronized with one of the first and the N-1 preshifted sequences of data bits being designated as a synchronized sequence. If a bit disparity occurs, the input sequence of data bits is resynchronized with one of the first and N-1 preshifted sequences of data bits being designated as a resynchronized sequence. In this manner, the cause of the bit disparity can be determined by calculating a bit shift number corresponding to a number of data bits the resynchronized sequence is shifted from the synchronized sequence.

22 Claims, 5 Drawing Sheets

TESTING DATA TRANSMISSIONS BETWEEN FAX MODEMS THROUGH REAL TIME SYNCHRONIZATION AND RESYNCHRONIZATION OF ASYNCHRONOUS DATA

BACKGROUND OF THE INVENTION (1) Field of the Invention

The present invention relates to the field of telecommunications, and more particularly, the field of testing fax modem transmissions in a looped-communications environment.

(2) Prior Art

In data transmissions between two regular, non-fax modems, data is transmitted asynchronously over the telephone line such that synchronization of the data on the receiving side must be performed in order to reconstruct the original data sent. One method for accomplishing this synchronization is to inject start and stop bits between the transmission of data characters (i.e. eight bits) in the data stream so as to signal to the receiving modem when valid data is being received. Another method for reconstructing the originally transmitted data is to utilize a protocol, such as MNP or V.42, which packetizes the data characters into blocks on the transmitting side and depacketizes the blocks on the receiving side. These higher level protocols, such as MNP4 and V.42, provide error detection capabilities by adding Cyclic Redundancy Checking (CRC) information to the frames, while protocols such as MNP5 and V.42bis provide data compression in addition to error detection.

Due to the inherent synchronization of the data stream, testing of regular, non-fax modems in a looped-communications environment (where data terminal equipment (DTE) such as a computer is coupled between the asynchronous ports of the modems) is relatively straight forward since the data input to the transmitting modem can be directly compared with the data output from the receiving modem to the DTE. The data sent from the DTE to the transmitting modem has start and stop bits which frame the characters for that modem. If the modems are using a high-level protocol, character framing information is retained in the data stream over the synchronous line such that the receiving modem can reconstruct the data, add new start and stop bits, and send the identical characters to the receiving DTE. If the modems are not using a high-level protocol (e.g. direct mode), then the start and stop bits are sent over the synchronous line with the character data such that the receiving DTE once again gets the identical characters that were previously transmitted. Upon receipt, the data characters are collected in the computer's receive buffer in units of eight bits called "octets" for comparison with the octets initially output from the computer's transmit buffer.

However, with fax modems (and other data transmission devices which utilize asynchronous serial ports for connecting to DTE equipment), the data transmissions are synchronous over the telephone line while asynchronous over an RS-232 serial line used to connect DTE equipment such as the computer which performs the testing. Data bits are transmitted synchronously over the telephone line. However, before the data bits are transmitted, "marks" (or binary "one" bits) are sequentially sent over the line to fill time. The data bits input to the transmitting fax modem from the computer are then injected into the stream of marks after a short but random amount of time, thereby causing a random offset of the data bits with respect to the octets that the receiving fax modem is sending to the computer. This random offset of the data bits is carried forward in the octets subsequently input to the computer to make the testing of data integrity in transmissions between fax modems quite difficult in a looped communication environment. This is because the octets received by the computer are possibly bit-shifted from those originally transmitted, therefore preventing direct comparison between the originally transmitted and subsequently received octets.

One method designed to overcome the above-noted problem is the implementation of a special synchronous port in each of the fax modems specifically designed for the purpose of testing the modems. (One such system which utilizes this method is known as TAS, produced by Telecom Analysis Systems, Inc.). The data bits are synchronously transmitted from the computer through the port directly into the data pump firmware which retransmits the data over the telephone line. The data bits received by the receiving modem are then output synchronously via its synchronous port to the computer. In this way, the transmission of data about the loop is kept synchronous so that the computer can compare byte for byte the input with the output to check for bit disparities. The problem with this method is that the special synchronous ports implemented in each of the fax modems utilize only the datapump portion for the generation and transmission of the signal waveforms over the telephone line. Therefore, by bypassing the majority of the protocol required to operate the fax modems during normal use, this testing method fails to detect many possible errors in the protocol. Hence, it would be desirable to provide a method which could test data transmissions between fax modems without having to develop components especially designed for testing and without having to bypass the normal flow of data through the protocol portion of the fax modems.

It is therefore an object of the present invention to provide a method and apparatus for testing data transmissions between fax modems which tests the integrity of the data transmissions under normal operation of the fax modems.

It is another object of the present invention to provide a method and apparatus for testing data transmissions between fax modems in a looped communications environment through synchronization and resynchronization of data bits output from the computer to the transmitting fax modem with the data bits input to the computer from the receiving fax modem.

It is a further object of the present invention to provide a method and apparatus for testing data transmissions between fax modems in which the data bits output from and input to the computer are synchronized and resynchronized by comparing the octets input to the receive buffer of the computer with corresponding octets of an original buffer and a predetermined number of preshifted buffers having data bits shifted from those of the original buffer.

Yet another object of the invention is to provide a method and apparatus for testing data transmissions between fax modems which tests for, among other things, throughput information, bit errors, bit/octet insertions and deletions, flow control and DLE shielding.

SUMMARY OF THE INVENTION

The present invention provides a method and apparatus for testing data transmissions between fax modems through synchronization and resynchronization on the data bits input to the computer from the receiving fax modem. In a closed loop testing environment, such as the one shown in FIG. 1, first and second fax modems are connected together via a synchronous telephone line and are coupled to a computer via first and second asynchronous lines to the computer's COM1 and COM2 ports. The computer itself runs the program embodying the method for synchronizing the data bits, analyzing the data input with that output and recording the statistical information derived therefrom.

In preparation for the test, the program creates a first, test buffer filled with randomly generated data bits in addition to seven preshifted buffers. Each of the preshifted buffers comprises the same sequence of data bits as in the first buffer, but in each sequential buffer, the sequence is shifted by one bit in a direction from the LSB to the MSB. Upon transmission of the data bits of the first, test buffer between the fax modems, the data bits input from the second, receiving fax modem to the computer are analyzed so that the program can synchronize the first octet which comprises valid data bits with one of the corresponding octets of the eight buffers stored in the computer's memory. After the program has "locked" onto the data stream so that the input octets received by the computer sequentially match the octets in one of the eight buffers, it starts checking for bit errors, bit insertions, bit deletions, octet insertions and octet deletions during subsequent octet comparisons.

Upon matching the first input octet having a non-mark data bit with the first octet of a Rth matching buffer, the program calculates the random offset caused by the injection of the data bits (at a random point in time) into the initial stream of marks. This is done by determining the difference P between the assigned buffer numbers of the first buffer and the Rth matching buffer where P=R−1. Once the input octets are initially synchronized with the octets of one of the eight buffers (then designated as a "matched" or "synchronized" buffer), the program continues to compare subsequent input octets with the corresponding octets of the same Rth matched buffer until no match is found between corresponding octets.

When the octets fail to match, this indicates that the input data has either bit error(s) or bit (or octet) insertion(s) or deletion(s). The program then compares the subsequent input octets with the corresponding subsequent octets in each of the eight buffers until a match is found. If a match is found in a buffer different from the Rth matched buffer, this indicates that bit insertion(s) or deletion(s) have occurred in the non-matching input octet. The program determines how many bits have been inserted or deleted by calculating the difference P between the Rth matched buffer and the Mth subsequently matched (or "resynchronized") buffer where P=R−M. On the other hand, however, if a subsequent match is made in the same Rth matched buffer after a particular octet fails to match, this indicates that a bit error has occurred. In this case, the program compares the actual bit values within the non-matching octet or octets and counts the number of incorrect bits. In either case, the program then cycles back to the next pair of corresponding octets if not all the octets of the first buffer have been received and compared, and if an insertion or deletion occurred, continues synchronizing the input octets with the octets of the Mth subsequently matched buffer by setting R=M (i.e., by setting R=R−P) so that the Mth subsequently matched buffer becomes the Rth matched buffer.

As the program cycles through consecutive octet comparisons, it also performs DLE shielding of the transmitted data characters when needed so as to adhere to the protocol of the fax modems. Additionally, after each buffer has been transmitted, flow control for the modems can be tested and the flow control delays can be recorded. Finally, according to an alternate embodiment, the method of the present invention can be implemented in a special purpose computer system adapted specifically for testing of data transmissions between two fax modems.

BRIEF DESCRIPTION OF THE DRAWINGS

The objects, features and advantages of the present invention will become apparent from the following detailed description in which.

DETAILED DESCRIPTION OF THE INVENTION

A method and apparatus for testing data transmissions between fax modems through synchronization and resynchronization on the data bits input to the computer from the receiving fax modem is described. In the following description, numerous specific details are set forth such as specific steps in the testing procedures, architectures, data rates, etc. in order to provide a thorough understanding of the present invention. It will be obvious, however, to one skilled in the art that these details are not required to practice the present invention. In other instances, well-known system components, test features, methods and the like are not set forth in detail in order to avoid unnecessarily obscuring the present invention.

Figure 1:
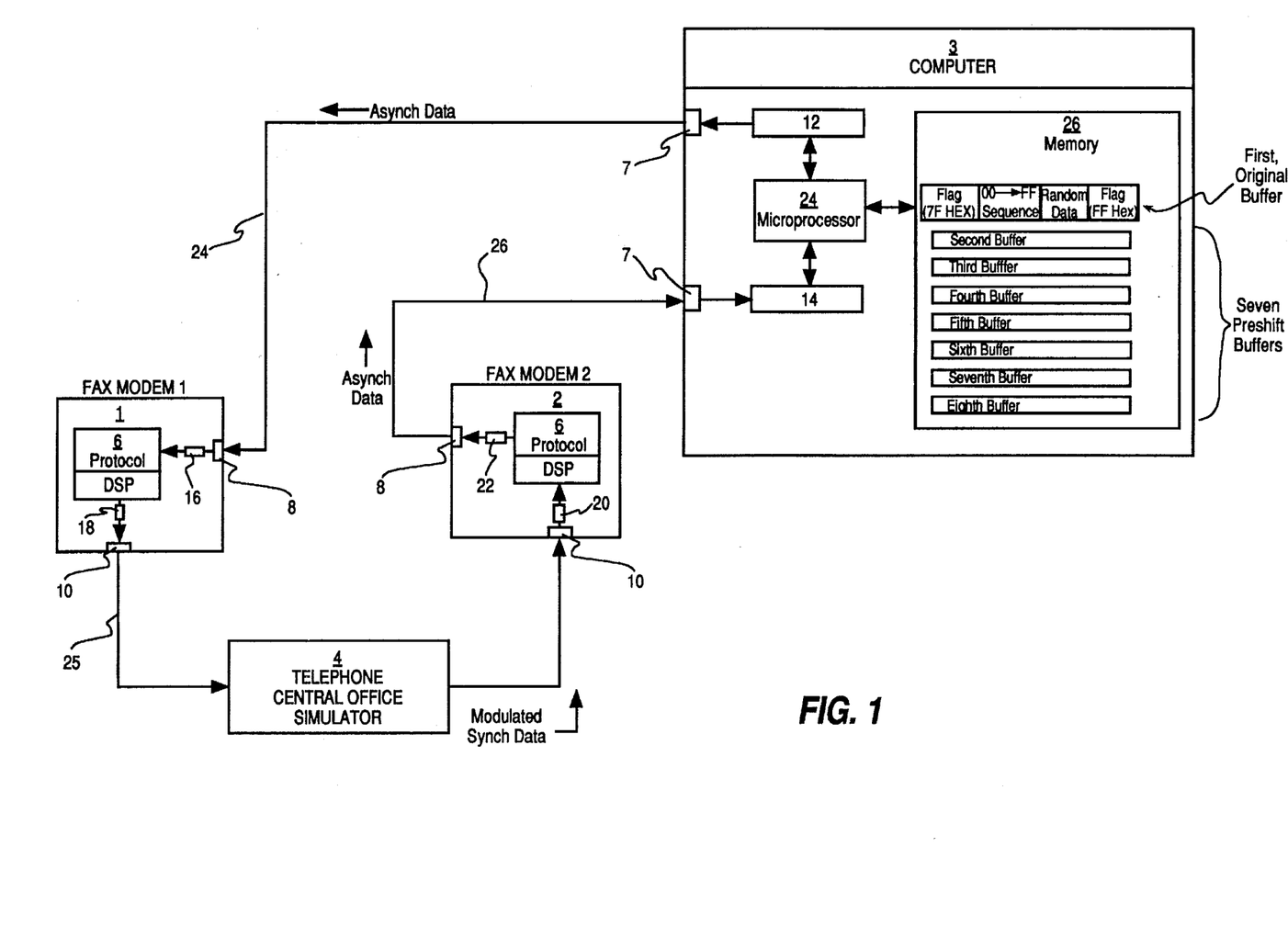
FIG. 1 is a schematic block diagram of the present invention showing the looped-back configuration of two fax modems with a computer which performs the testing, the computer having stored in memory eight buffers with different offsets of data bits for comparison with the data bits originally transmitted.

In a closed loop testing environment, such as the one shown in FIG. 1, first and second fax modems 1,2 are connected together via a synchronous telephone line 25 coupled to the fax modems 1,2 by means of RJ11 phone jacks 10. The telephone line 25 is run through a telephone central office simulator 4, such as model 5100 and 5101 telephone simulators marketed by Processing Telecom Technologies, Inc., so as to reproduce actual telephone network conditions for testing of the fax modems 1,2. Each of the modems 1,2 shown in FIG. 1 comprise a receive buffer 16,20, a transmit buffer 18,22 and a combined hardware/software protocol unit 6. To close the test loop, a computer 3 acting as a DTE is connected to the asynchronous ports 8 of the first and second fax modems 1,2 via two asynchronous, serial RS-232 lines 24,26 which are coupled to the computer's COM1 and COM2 ports 7, respectively. The computer 3 itself runs the program embodying the method for synchronizing the data bits, analyzing the data input with that output and recording the statistical information derived therefrom. According to the present invention, any type of computer 3 may be utilized as long as (1) it has sufficient memory for storing the test data used in comparing the input data steam with the output data stream and (2) can handle the communications bandwidth over its two COM ports 7 simultaneously at the minimum speed required for the fax modem data rate being tested. That is, the COM port minimum speed for a given data rate over the line 25 must always be greater than the line rate to prevent a loss of data. For example, when testing V.29 9600 bps fax modems, the COM port speeds must be set to the next higher DTE rate which the fax modems 1,2 and COM ports 7 can handle, this typically being 19200 bps.

The program embodying the preferred method of the present invention, a copy of which in source code format is appended hereto as Appendix A for reference, was originally developed for use in testing T.4/T.30 fax transmissions between Class 1 V.27/V.29 fax modem chipsets. The program is designed to record and subsequently display to the user line throughput information (bps), transmitter XOFF/XON (or hardware CTS toggle) counts, DLE shielding counts for both the transmitter and receiver of the computer, bit error counts (with lists of received versus expected bits and past history), computer receiver XOFF (or not RTS)-to-stop delay and computer receiver XON (or RTS)-to-start-delay. Furthermore, the program is also written so that the tests can be run either interactively or from a batch file, and so that data used to test the fax modems can be randomly generated or derived from a user-specified file.

Figure 2:
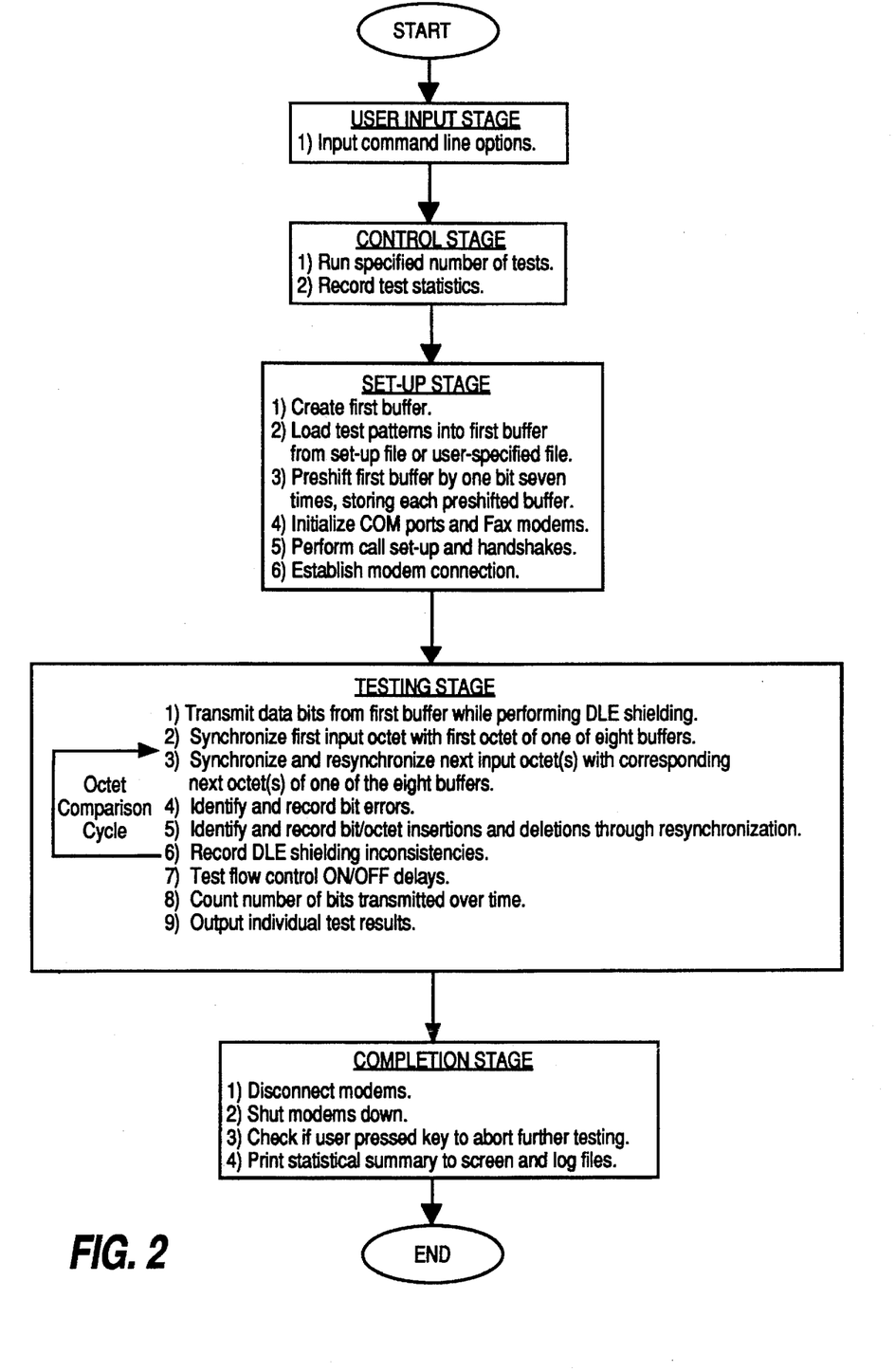
FIG. 2 is an algorithm of the general method showing the five stages of the test.

The following description is a summary of the general method of the present invention corresponding to the different stages of operation shown in FIG. 2. The first or user input stage is implemented to obtain input from the user or a batch file for setting the command line options for the test. By example only, some of the command line options are –d, do not toggle DTR; –h, never hang up; –help, print this list; –i#, ignore the first # of characters; –n, do not list bit errors in log file; –nn, do not list block errors in the log file; –p#, pause for # of seconds after the connection is made before sending the test pattern; –r, do not attempt to realign on bit-shifted data; –t, high speed self test with added errors; and –v, be verbose when printing messages. When the options are selected, a summary is printed to the screen and/or log files if desired, and the test is commenced.

The second or control stage, shown in FIG. 2, is the outer loop of the test. This stage counts the number of tests that have been performed and keeps track of the overall outcome statistics of the tests. The third or set-up stage allocates memory 26 in the computer 3 for creation of the first buffer and a plurality of preshifted buffers, loads the test patterns from a setup file or user-specified file into the first buffer and preshifts the first buffer by one bit seven times. Each new preshifted buffer is stored in memory 26 as buffers 2 through 8 (shown in FIG. 1), while wrap-around is implemented for each of the eight buffers. The program then initializes the ports of the computer 3 and the modems 1,2, performs the call setup and handshakes, and finally connects the modems 1,2 in preparation for the data transmission. With reference to steps 7 and 8 of the more detailed algorithm shown in FIG. 3, upon completion of the setup stage, the program determines whether initialization has been properly completed and the line connection has been properly established. If not, the program checks to see if the user has pressed a key, and if so, aborts the testing.

With reference to FIG. 2 again, the fourth or testing stage is the inner loop of the test itself. Here, the first fax modem's transmit buffer 18 is continuously stuffed with the data held in the first buffer which has been transferred to the computer's transmit buffer 12. It is important to note that once the data transmission has begun, the data from the computer 3 must be input to the first fax modems transmit buffer 18 at a high enough rate to prevent loss of the line connection caused by substantial delay between data transmissions (a condition called "underrun" or "transmitter starvation"). Conversely, flow control for the first fax modem's transmitter (not shown) is accounted for so that the first fax modem's transmit buffer 18 is not overrun.

Upon transmission of the data bits between the fax modems 1,2, the data bits input from the second, receiving fax modem 2 to the computer 3 are analyzed so that the program can synchronize the first octet which comprises valid data bits with one of the corresponding (i.e. first) octets of the eight buffers stored in the computer's memory 26. After the program has "locked" onto the data stream so that the input octets received by the computer 3 sequentially match the octets in one of the eight buffers, it starts checking for bit errors, bit insertions, bit deletions, octet insertions and octet deletions during subsequent octet comparisons. When the first buffer has been completely cycled through, the program performs a flow control test. After the flow control test is finished, the results for the individual tests are then output to the screen and/or the log file. Finally, in the fifth or completion stage of operation shown in FIG. 2, once all the data of the first buffer has been transmitted the specified number of times and the user does not want to continue the test with the same data, the program disconnects the modems 1,2 and checks if the user has pressed a key, thereby requesting that the tests be terminated. If so, the program shuts the modems 1,2 down and outputs a statistical summary for all the tests to the screen and/or log files.

Figure 3A:
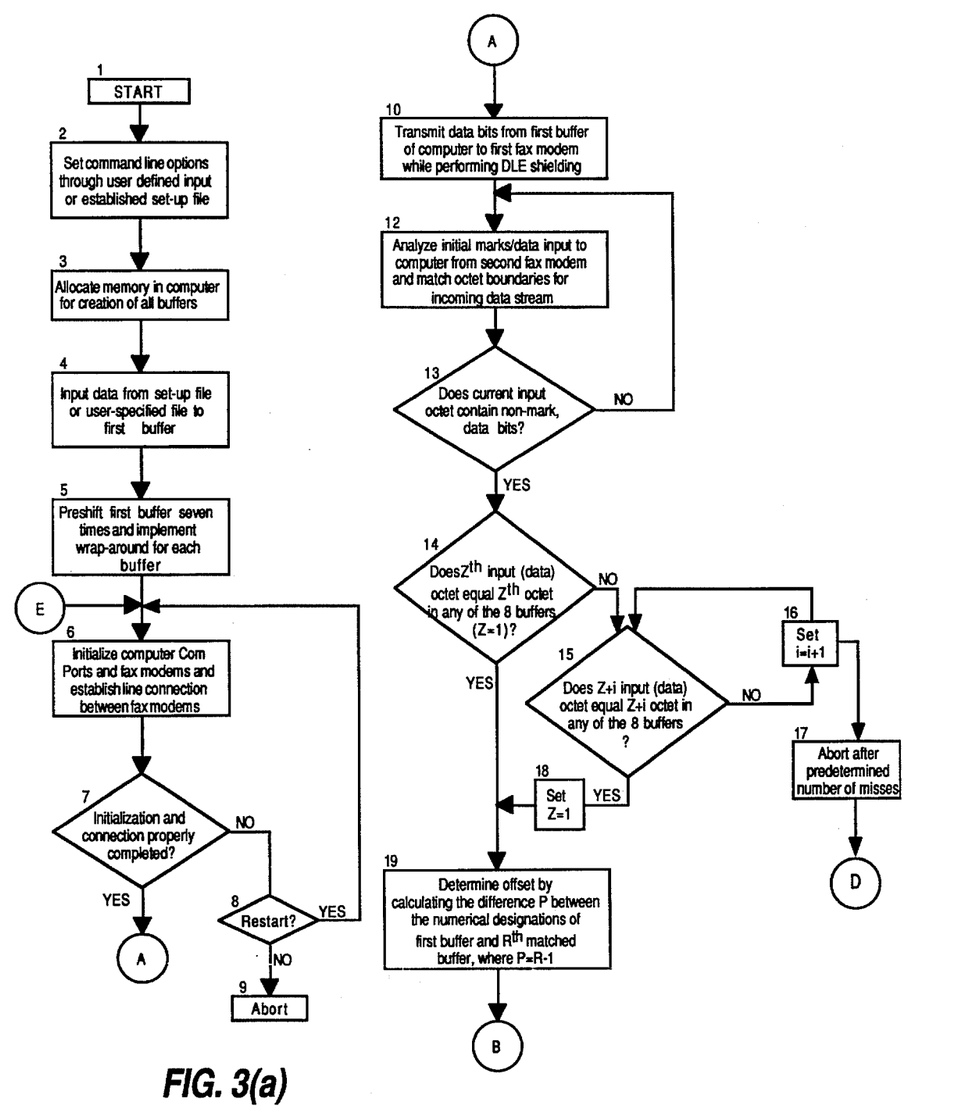
FIG. 3a is the first portion of a detailed algorithm describing the method of the present invention.
Figure 3B:
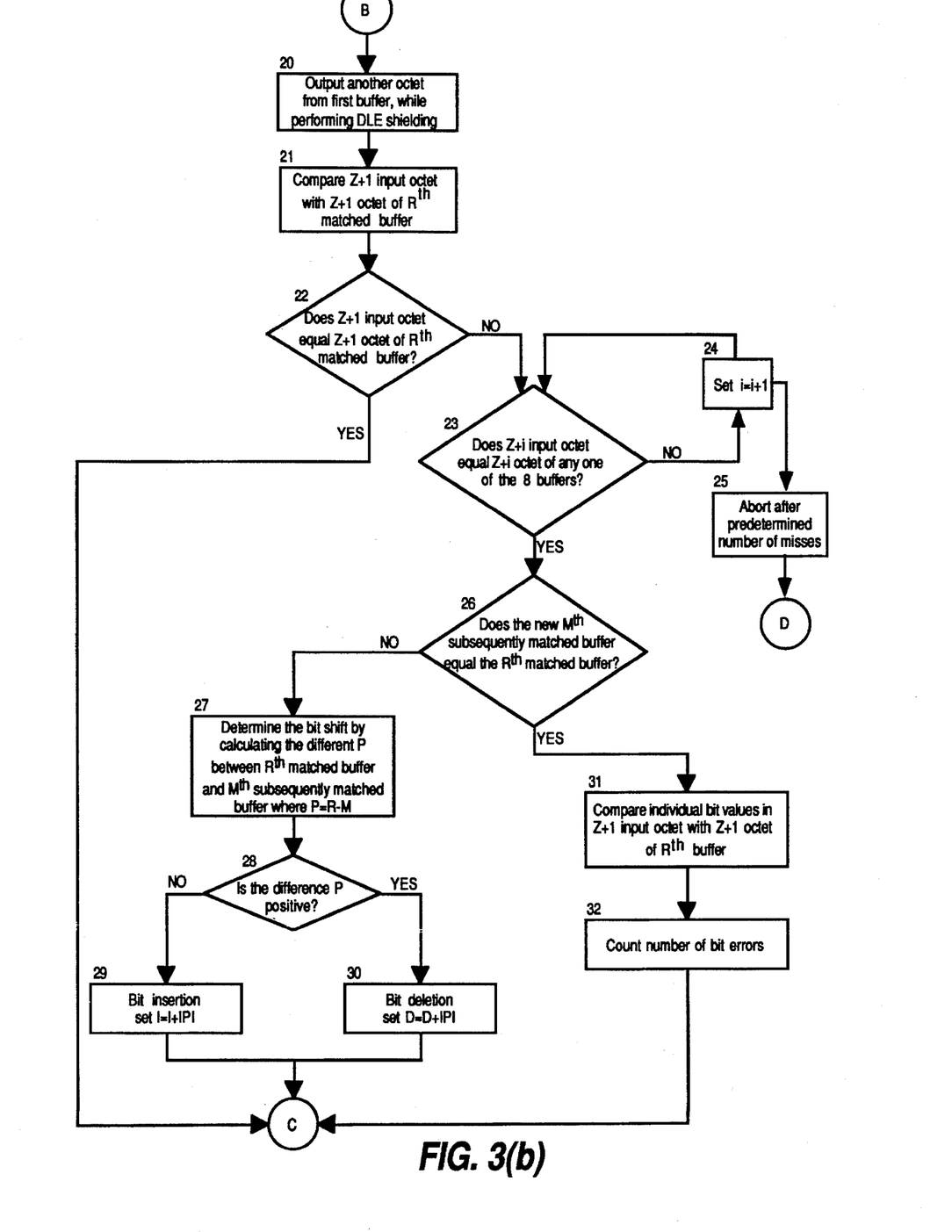
FIG. 3b is the second portion of the detailed algorithm (beginning in FIG. 3a) describing the method of the present invention.
Figure 3C:
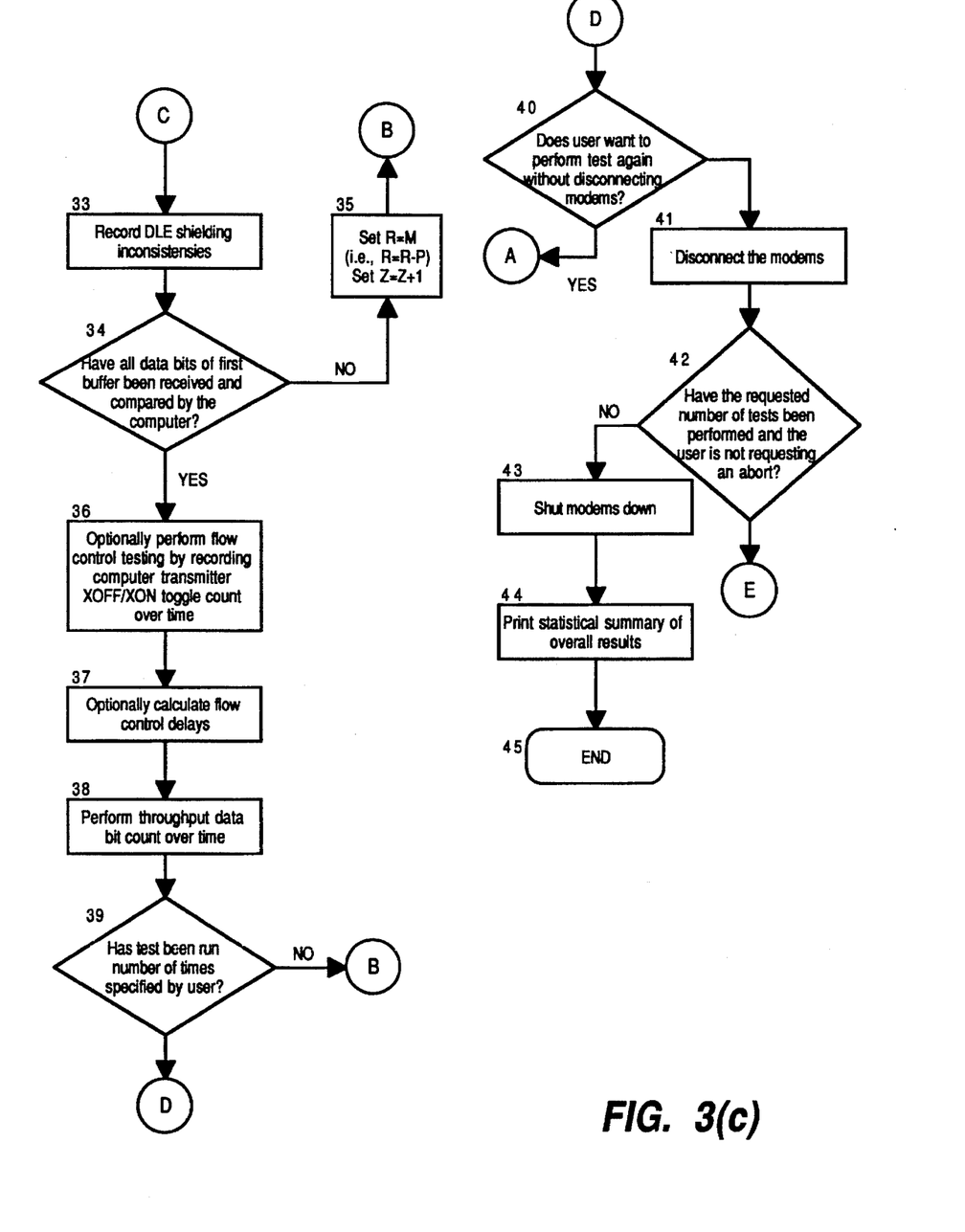
FIG. 3c is the third portion of the detailed algorithm (beginning in FIG. 3a) describing the method of the present invention.

Now with reference to the detailed algorithm shown in FIG. 3, once the connection between the fax modems 1,2 has been established (steps 6–9), the first fax modem 1 transmits marks (i.e. a sequence of binary ones) until valid data is received in the first fax modem's transmit buffer 18. The second fax modem 2 begins receiving the marks and establishes octet boundaries for the incoming data stream (i.e. grouping the data bits into sets of eight) although no data is actually present in the stream of marks. The octets established by the second fax modem 2 are subsequently sent to the receive buffer 14 of the computer 3 for comparison with corresponding octets in one of the eight buffers stored in memory 26. The program ignores the first few input octets which contain only marks, and selects the first octet which contains at least one non-mark, data bit (i.e. a binary zero) for comparison with the first octet of each of the eight buffers (step 13).

As previously noted, the test data contained within the first buffer is shifted by one bit seven times, with each new "preshifted buffer" being saved in the computer's memory 26. In each case, the data bits are shifted to the left (i.e. from the lowest significant bit to the most significant bit), and the residual bits from the preceding octet are filled into the LSB of the new shifted octet. By shifting the first buffer seven times, the program guarantees that the first input octet having a non-mark data bit (in addition to anywhere from zero to seven marks) will match one of the eight buffers as long as no bit errors, insertions or deletions exist in that particular octet. However, in order to provide for those cases in which the first input octet does have a bit error, insertion or deletion, additional steps may be added whereby the second, third, fourth, etc. input octets are compared with the corresponding second, third, fourth, etc. octets of the eight buffers until a match is found (i.e., steps 15–17 where a predetermined number (i) of consecutive octets will be compared). In this manner, initially transmitted octets having distorted bit patterns due to the noise present on the telephone line will not cause the test to fail.

It is noted that the preferred method of the present invention utilizes eight sequences of corresponding albeit bit shifted data bits stored into eight separate buffers, including a first buffer and two through eight preshifted buffers with each sequence of data bits being partitioned into units comprising eight data bits (i.e. octets). However, it would be obvious to one skilled in the art to modify the method of the present invention so as to utilize a predetermined number (N–1) of sequences or buffers depending upon the number of data bits (N) that are chosen for each unit. For example, if it were desired to compare a larger number of data bits during each comparison cycle, each sequence of data bits could be portioned into units comprising 16 data bits. In this example, 15 preshifted buffers or sequences of data bits would have to be formed by successively shifting each consecutive preshifted sequence by one bit from the preceding sequence (starting from the first, original buffer).

Upon matching the first or Zth input octet having a non-mark data bit (steps 14 and 15), for example, with the first or Zth octet of a Rth matching buffer, the program immediately saves the offset caused by the injection of the data bits (at a random point in time) into the initial stream of marks. This is done by determining the difference P between the assigned buffer numbers of the first buffer and the Rth matching buffer where P=R–1 (step 19). Once the input octets are initially synchronized with the octets of one of the eight buffers (then designated as a "matched" or "synchronized" buffer), the program continues to compare subsequent input octets with the corresponding octets of the same Rth matched buffer until no match is found between corresponding octets (steps 21 and 22).

When the octets fail to match, this indicates that the input data has either bit error(s) or a bit (or octet) insertion(s) or deletion(s). To determine whether bit error(s) or a bit insertion(s)/deletion(s) have occurred, the program compares the subsequent input octets with the corresponding subsequent octets in each of the eight buffers until a match is found (steps 23–25). If no match is found, it is unlikely that an insertion or deletion has occurred, and the error is flagged as having been caused by noise (step 25). If a match is found in a buffer different from the Rth matched buffer (step 26), this indicates that bit insertion(s) or deletion(s) have occurred in the non-matching input octet due to the fact that the input bit sequence with respect to the octet boundaries is now different from the bit sequence in the Rth matched buffer. In steps 27–30, the program determines how many bits have been inserted or deleted by calculating the difference P between the Rth matched buffer and the Mth subsequently matched (or "resynchronized") buffer where P=R–M. In addition, the bit insertions and deletions can be separately accounted for by determining whether the difference P is positive (a bit deletion) or negative (a bit insertion), assuming the buffers are numbered from top to bottom and are sequentially shifted by one data bit in a direction from the LSB to the MSB in that order.

On the other hand, however, if a subsequent match is made in the same Rth matched buffer after a particular octet fails to match, this indicates that a bit error has occurred due to the fact that the bit sequence with respect to the input octets has not changed, but that the bits in the sequence were simply wrong. In this case, the program compares the actual bit values within the non-matching octet or octets and counts the number of incorrect bits (steps 31 and 32). In either case, the program then cycles back to the next pair of corresponding octets (i.e., in the computer's receive buffer and the Mth subsequently matched buffer) if not all the octets of the first buffer have been received and compared, and if an insertion or deletion has occurred, the program continues synchronizing the input octets with the octets of the Mth subsequently matched buffer by setting R=M (i.e. by setting R=R–P) so that the Mth subsequently matched buffer becomes the Rth matched buffer (steps 34 and 35).

As the program cycles through consecutive octet comparisons, it also performs DLE shielding of the transmitted data characters when needed, an essential operation that could not be performed and/or tested with conventional testing methods and testing configurations (see steps 33 and 34). In Class 1 fax modems, the protocol for the modems 1,2 is designed to detect an end of page frame through receipt of a DLE (or 10 Hex) character followed by receipt of a ETX (or 03 Hex) character. If, however, a single DLE character is received as input, the receiving fax modem 2 will interpret the single DLE character as control character which will be decoded by the receiving fax modem 2 as an unintelligible command if it is not shielded with another DLE character (to indicate it is regular fax data) or followed by another control character (to designate a specific command). Hence, DLE shielding must be performed at least in the transmitting modem since the transmission of DLE characters over the synchronous line 25 must be distinguished from raw fax data. In the present invention, however, DLE shielding is performed throughout the entire looped-back testing setup by means of the computer 3 shielding each output DLE character in the data stream with an additional sequential DLE character and stripping off the additional DLE character from an input of two DLE's transmitted by the second fax modem 2. In this manner, the present invention permits the entire protocol of each fax modem 1,2 to be tested with respect to bit or octet insertions and deletions in addition to the recording and deciphering of any DLE inconsistencies. For example, if the receiving fax modem 2 failed to properly perform DLE shielding, the program could detect this failure by identifying entire data character deletions from the data stream input to the computer's receive buffer 14.

After each transmission of the entire buffer, flow control is optionally tested and throughput information is collected (steps 37–40). With respect to flow control testing, the program records the number of times the first fax modem 1 requests the DTE to stop and resume data transmission. Furthermore, if the user has opted to test software flow control during entry of the command line options, the program records the time delay between the transmission of an XOFF character (13 Hex) to the receiving fax modem 2 and the time at which the receiving fax modem 2 stops sending data to the computer 3, as well as the time delay between the transmission of an XON character (11 Hex) to the receiving fax modem 2 and the time at which the receiving fax modem 2 resumes sending data to the computer 3. Alternatively, if the user has opted to test the hardware-type flow control where the same delays are timed, the mechanisms used for testing the flow control is the RTS (request to send) and the CTS (dear to send) RS-232 lines. Finally, with respect to recordation of the throughput information, the program counts the number of bits that are transmitted over time so as to calculate the bits per second rate.

In an alternate embodiment, the method of the present invention can be implemented in a special purpose computer system adapted specifically for testing of data transmissions between two fax modems 1,2. Such a computer system comprises means for storing in memory a first sequence of data bits; means for storing in memory N–1 preshifted sequences of data bits with the data bits of each consecutive preshifted sequence being sequentially shifted by one data bit from the first sequence; means for transmitting the data bits of the first sequence to the first modem via the first asynchronous connection for retransmission to the second modem via the synchronous connection; and means for receiving as input to the computer via the second asynchronous connection an input sequence of data bits transmitted from the second modem. Additionally, for performing the tests, the computer system further comprises means for synchronizing the input sequence of data bits with one of the first and the N−1 preshifted sequences of data bits forming a synchronized sequence and for resynchronizing the input sequence of data bits with one of the first and N−1 preshifted sequences of data bits forming a resynchronized sequence each time a bit disparity between corresponding units of the input sequence and the synchronized sequence occurs; and means for determining the cause of a bit disparity each time a bit disparity occurs through calculation of a bit shift number corresponding to a number of data bits the resynchronized sequence is shifted from the synchronized sequence.

While the invention has been described in conjunction with the preferred embodiment, it is evident that numerous alternatives, depictions, variations and uses will be apparent to those skilled in the art in light of the foregoing description. Particularly, the present invention is not to be limited to fax modems only as it may be applied to any data transmission devices which utilize asynchronous serial ports for connecting to DTE equipment. It will also be recognized that the above described invention may be embodied in other specific testing arrangements and may include modified testing procedures for applications in testing of other types of data communication modems without departing from the spirit or essential elements of this disclosure. Thus, it is understood that the invention is not to be limited by the foregoing illustrative details, but rather is to be defined by the appended claims.

I claim:

1. A method for testing data transmissions sent via a synchronous connection between first and second data transmission devices through the use of a computer having memory, the computer being coupled to the first and second data transmission devices via first and second asynchronous connections, respectively, the method comprising the steps of:

(A) storing in memory a first sequence of data bits partitioned into units with each unit comprising N data bits;

(B) storing in memory N−1 preshifted sequences of data bits with the data bits of each preshifted sequence being partitioned into units comprising N data bits, the first preshifted sequence formed by shifting the first sequence by one bit, and subsequent preshifted sequences formed by shifting the preceding preshifted sequence by one bit;

(C) transmitting the data bits of the first sequence to the first device via the first asynchronous connection for re transmission to the second device via the synchronous connection;

(D) receiving as input to the computer via the second asynchronous connection an input sequence of data bits transmitted from the second device, the input sequence partitioned into input units with each input unit comprising N data bits;

(F) synchronizing the input sequence of data bits with one of the first and the N−1 preshifted sequences of data bits being designated as a synchronized sequence;

(G) resynchronizing the input sequence of data bits with one of the first and N−1 preshifted sequences of data bits being designated as a resynchronized sequence when a bit disparity between corresponding units of the input sequence and the synchronized sequence occurs;

(H) determining the cause of the bit disparity by calculating a bit shift number corresponding to a number of data bits the resynchronized sequence is shifted from the synchronized sequence;

(I) continuing synchronization of the input sequence of data bits with the resynchronized sequence;

(J) redesignating the resynchronized sequence as the synchronized sequence when a bit disparity between corresponding units of the input sequence and the resynchronized sequence occurs; and (K) performing steps (G) through (J) until all data bits of the first sequence have been transmitted and subsequently received by the computer.

2. The method of claim 1, wherein the first and second data transmission devices comprise fax modems.

3. The method of claim 1, wherein the first preshifted sequence is shifted by one data bit from the first sequence in a direction from the least significant bit to the most significant bit, and each succeeding preshifted sequence is shifted by one data bit from each preceding preshifted sequence in a direction from the least significant bit to the most significant bit.

4. The method of claim 3, wherein the step (H) of determining the cause of the bit disparity comprises the step of calculating a difference P between assigned numbers of the synchronized sequence R and a resynchronized sequence M where P=R−M, the assigned numbers corresponding to a consecutive arrangement of the first and N−1 preshifted sequences with respect to the bit shifts between each of the first and N−1 sequences, with the assigned numbers increasing in magnitude as successive sequences contain more bit shifts.

5. The method of claim 1, wherein the step (F) of synchronizing the input sequence of data bits with one of the first and the N−1 preshifted sequences of data bits being designated as a synchronized sequence comprises the steps of:

comparing a consecutive input unit of the input sequence with corresponding consecutive units of each the first and N−1 preshifted sequences until a match occurs with a corresponding consecutive unit of a matched sequence; and matching corresponding subsequent consecutive units between the input sequence and the matched sequence forming the synchronized sequence.

6. The method of claim 1, wherein the step (G) of resynchronizing the input sequence of data bits with one of the first and N−1 preshifted sequences of data bits being designated as a resynchronized sequence when a bit disparity between corresponding units of the input sequence and the synchronized sequence occurs comprises the steps of:

comparing a consecutive input unit of the input sequence with corresponding consecutive units of each the first and N−1 preshifted sequences until a match occurs with a corresponding consecutive unit of a matched sequence; and matching corresponding subsequent consecutive units between the input sequence and the matched sequence forming the resynchronized sequence.

7. The method of claim 6, wherein the step (H) of determining the cause of the bit disparity further comprises the steps of:

recording as bit errors of the subsequent input unit of the input sequence non-matching data bit values between the subsequent input unit of the input sequence and the corresponding subsequent unit of the subsequently matched sequence when the difference P is zero;

recording as bit deletions in the subsequent input unit of the input sequence a number corresponding to an absolute value of the difference P when the difference P is a positive, non-zero value;

recording as bit insertions in the subsequent input unit of the input sequence a number corresponding to an absolute value of the difference P when the difference P is a negative, non-zero value.

8. The method of claim 1, wherein the method further comprises the steps of:

performing DLE shielding during transmission of the data bits of the first sequence to the first device; and recording DLE shielding inconsistencies during reception of the data bits of the input sequence to the computer.

9. The method of claim 1, wherein after the step (K) of performing steps (G) through (J) until all data bits of the first sequence have been transmitted and subsequently received by the computer, the method further comprises the steps of:

asserting a first flow control command, the first flow control command comprising a command selected from the group consisting of a software command forming an XOFF signal transmitted to the second device and a hardware command forming a high CTS signal transmitted to the second device;

timing a first delay between assertion of the first flow control command and an end of transmission of the data bits being transmitted from the second device to the DTE;

asserting a second flow control command, the second flow control command comprising a command selected from the group consisting of a software command forming an XON signal transmitted to the second device and a hardware command forming a low CTS signal transmitted to the second device; and timing a second delay between assertion of the second flow control command and a start of transmission of the data bits being transmitted from the second device to the DTE.

10. The method of claim 1, wherein the units of data bits of the first sequence comprise octets with each octet having eight data bits, the N−1 preshifted sequences of data bits comprise seven preshifted sequences being designated as second, third, fourth, fifth, sixth, seventh and eighth sequences of data bits, and the units of each preshifted sequence comprise octets with each octet having eight data bits.

11. A method for testing data transmissions over a synchronous connection between first and second data transmission devices comprising fax modems through the use of a computer having memory, the computer being coupled to the first and second data transmission devices via first and second asynchronous connections, respectively, the method comprising the steps of:

(A) storing in memory a first sequence of data bits partitioned into units with each unit comprising N data bits;

(B) storing in memory N−1 preshifted sequences of data bits with the data bits of each preshifted sequence being partitioned into units comprising N data bits, each of the preshifted sequences comprising data bits corresponding to the data bits of the first sequence with a first preshifted sequence formed by shifting the first sequence as a whole by one data bit and each succeeding preshifted sequence formed by shifting each preceding preshifted sequence as a whole by one data bit in a direction from the least significant bit to the most significant bit in each case;

(C) transmitting the data bits of the first sequence to the first device via the first asynchronous connection for retransmission to the second device via the synchronous connection;

(D) receiving as input to the computer via the second asynchronous connection an input sequence of data bits transmitted from the second device;

(F) partitioning the data bits of the input sequence into input units for comparison with the units of the first sequence and the preshifted sequences;

(G) synchronizing consecutive input units of the input sequence with consecutive units in one of the first and N−1 preshifted sequences forming a matched sequence R;

(H) resynchronizing a subsequent input unit of the input sequence with a corresponding subsequent unit of one of the first and the N−1 preshifted sequences forming a subsequently matched sequence M when a bit disparity occurs between data bits in corresponding units of the input sequence and the matched sequence R;

(I) calculating a difference P between assigned numbers of the matched sequence R and the subsequently matched sequence M where P=R−M, the assigned numbers corresponding to a consecutive arrangement of the first and N−1 preshifted sequences with respect to the bit shifts between each of the first and N−1 sequences, with the assigned numbers increasing in magnitude as successive sequences contain more bit shifts;

(J) recording as bit errors of the subsequent input unit of the input sequence non-matching data bit values between the subsequent input unit of the input sequence and the corresponding subsequent unit of the subsequently matched sequence when the difference P is zero;

(K) recording as bit deletions in the subsequent input unit of the input sequence a number corresponding to an absolute value of the difference P when the difference P is a positive, non-zero value;

(L) recording as bit insertions in the subsequent input unit of the input sequence a number corresponding to an absolute value of the difference P when the difference P is a negative, non-zero value;

(M) continuing synchronization of consecutive units of the input sequence and the subsequently matched sequence;

(N) redesignating the subsequently matched sequence as the matched sequence when a bit disparity occurs between corresponding units of the input sequence and the subsequently matched sequence; and (O) performing steps (H) through (N) until all data bits of the first sequence have been transmitted and subsequently received by the computer.

12. The method of claim 11, wherein the step (F) of synchronizing the input sequence of data bits with one of the first and the N−1 preshifted sequences of data bits being designated as a synchronized sequence comprises the steps of:

comparing a consecutive input unit of the input sequence with corresponding consecutive units of each the first and N−1 preshifted sequences until a match occurs with a corresponding consecutive unit of a matched sequence; and matching corresponding subsequent consecutive units between the input sequence and the matched sequence forming the synchronized sequence.

13. The method of claim 11, wherein the step (G) of resynchronizing the input sequence of data bits with one of the first and N−1 preshifted sequences of data bits being designated as a resynchronized sequence when a bit disparity between corresponding units of the input sequence and the synchronized sequence occurs comprises the steps of:

comparing a consecutive input unit of the input sequence with corresponding consecutive units of each the first and N–1 preshifted sequences until a match occurs with a corresponding consecutive unit of a matched sequence; and matching corresponding subsequent consecutive units between the input sequence and the matched sequence forming the resynchronized sequence.

14. The method of claim 11, wherein the method further comprises the steps of:

performing DLE shielding during transmission of the data bits of the first sequence to the first device; and recording DLE shielding inconsistencies during reception of the data bits of the input sequence to the computer.

15. The method of claim 11, wherein after the step (K) of performing steps (G) through (J) until all data bits of the first sequence have been transmitted and subsequently received by the computer, the method further comprises the steps of:

asserting a first flow control command, the first flow control command comprising a command selected from the group consisting of a software command forming an XOFF signal transmitted to the second device and a hardware command forming a high CTS signal transmitted to the second device;

timing a first delay between assertion of the first flow control command and an end of transmission of the data bits being transmitted from the second device to the DTE;

asserting a second flow control command, the second flow control command comprising a command selected from the group consisting of a software command forming an XON signal transmitted to the second device and a hardware command forming a low CTS signal transmitted to the second device; and timing a second delay between assertion of the second flow control command and a start of transmission of the data bits being transmitted from the second device to the DTE.

16. The method of claim 11, wherein the units of data bits of the first sequence comprise octets with each octet having eight data bits, the N–1 preshifted sequences of data bits comprise seven preshifted sequences being designated as second, third, fourth, fifth, sixth, seventh and eighth sequences of data bits, and the units of each preshifted sequence comprise octets with each octet having eight data bits.

17. A computer system adapted for testing data transmissions sent via a synchronous connection between first and second data transmission devices through the use of a computer having memory, the computer being coupled to the first and second data transmission devices via first and second asynchronous connections, respectively, the computer system comprising:

means for storing in memory a first sequence of data bits partitioned into units with each unit comprising N data bits;

means for storing in memory N–1 preshifted sequences of data bits with the data bits of each preshifted sequence being partitioned into units comprising N data bits, each of the preshifted sequences comprising data bits corresponding to the data bits of the first sequence with a first preshifted sequence formed by shifting the first sequence by one data bit and each succeeding preshifted sequence formed by shifting the preceding preshifted sequence by one data bit;

means transmitting the data bits of the first sequence to the first device via the first asynchronous connection for retransmission to the second device via the synchronous connection;

means for receiving as input to the computer via the second asynchronous connection an input sequence of data bits transmitted from the second device;

means for synchronizing the input sequence of data bits with one of the first and the N–1 preshifted sequences of data bits forming a synchronized sequence and for resynchronizing the input sequence of data bits with one of the first and N–1 preshifted sequences of data bits forming a resynchronized sequence each time a bit disparity between corresponding units of the input sequence and the synchronized sequence occurs; and means for determining the cause of a bit disparity each time a bit disparity occurs through calculation of a bit shift number corresponding to a number of data bits the resynchronized sequence is shifted from the synchronized sequence.

18. The computer system of claim 17, wherein the first and second data transmission devices comprise fax modems.

19. The computer system of claim 17, wherein the first preshifted sequence is shifted by one data bit from the first sequence in a direction from the least significant bit to the most significant bit, and each succeeding preshifted sequence is shifted by one data bit from each preceding preshifted sequence in a direction from the least significant bit to the most significant bit.

20. The computer system of claim 19, wherein the means for determining the cause of a bit disparity calculates a difference P between assigned numbers of the synchronized sequence R and the resynchronized sequence M where P=R–M, the assigned numbers corresponding to a consecutive arrangement of the first and N–1 preshifted sequences with respect to the bit shifts between each of the first and N–1 sequences, with the assigned numbers increasing in magnitude as successive sequences contain more bit shifts.

21. The computer system of claim 20, wherein the computer system further comprises:

means for recording as bit errors of the subsequent input unit of the input sequence non-matching data bit values between the subsequent input unit of the input sequence and the corresponding subsequent unit of the subsequently matched sequence when the difference P is zero;

means for recording as bit deletions in the subsequent input unit of the input sequence a number corresponding to an absolute value of the difference P when the difference P is a positive, non-zero value; and means for recording as bit insertions in the subsequent input unit of the input sequence a number corresponding to an absolute value of the difference P when the difference P is a negative, non-zero value.

22. The computer system of claim 17, wherein the units of data bits of the first sequence comprise octets with each octet having eight data bits, the N–1 preshifted sequences of data bits comprise seven preshifted sequences being designated as second, third, fourth, fifth, sixth, seventh and eighth sequences of data bits, and the units of each preshifted sequence comprise octets with each octet having eight data bits.

\* \* \* \* \*

UNITED STATES PATENT AND TRADEMARK OFFICE
CERTIFICATE OF CORRECTION

| | | |
|---|---|---|
| PATENT NO. | : | 5,502,653 |
| DATED | : | March 26, 1996 |
| INVENTOR(S) | : | Glenn M. Lewis |

It is certified that error appears in the above-identified patent and that said Letters Patent is hereby corrected as shown below:

In column 8 at line 55 delete "(dear to send)" and insert --(clear to send)--

In column 10 at line 27 delete "a" and insert --the--

Signed and Sealed this

Twenty-eighth Day of January, 1997

Attest:

BRUCE LEHMAN

Attesting Officer     Commissioner of Patents and Trademarks